Dec. 19, 1939.  L. R. BUCKENDALE  2,183,667
DUAL RATIO DRIVE AXLE
Filed May 28, 1936   4 Sheets-Sheet 1

INVENTOR
L. Ray Buckendale
BY
Strauch & Hoffman
ATTORNEYS

Dec. 19, 1939.     L. R. BUCKENDALE     2,183,667
DUAL RATIO DRIVE AXLE
Filed May 28, 1936     4 Sheets-Sheet 2

INVENTOR.
L. Ray Buckendale
BY
Strauch & Hoffman
ATTORNEY.

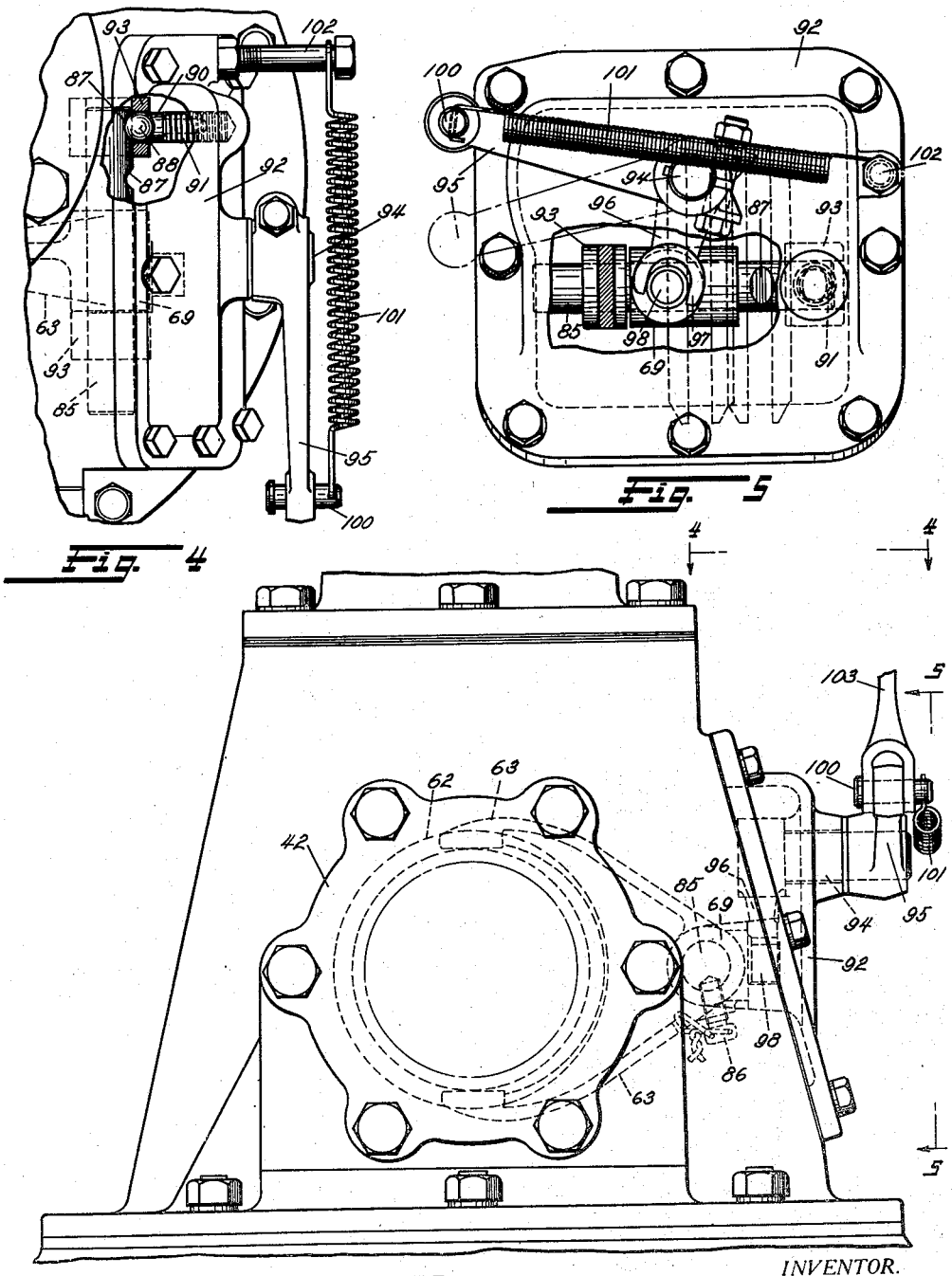

Dec. 19, 1939. L. R. BUCKENDALE 2,183,667
DUAL RATIO DRIVE AXLE
Filed May 28, 1936 4 Sheets-Sheet 4
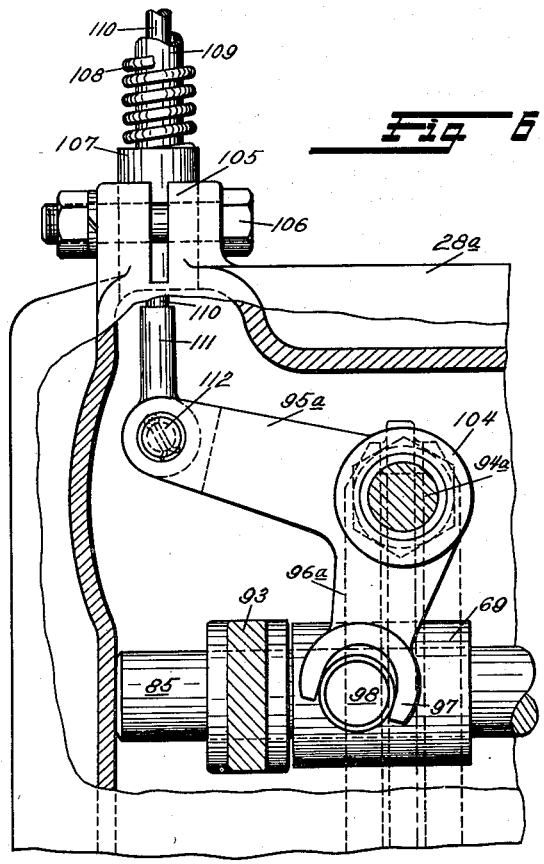
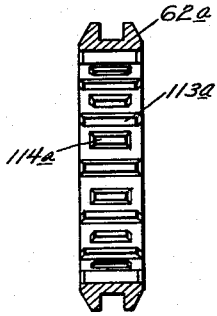
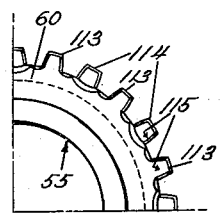
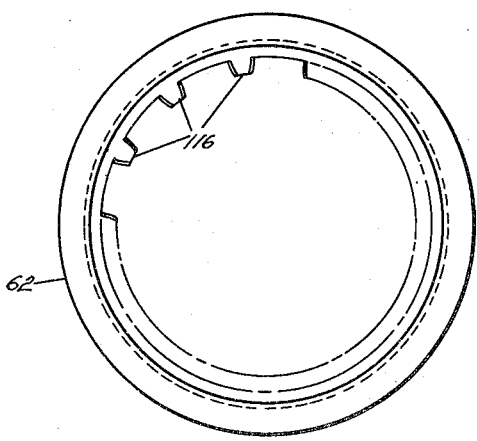
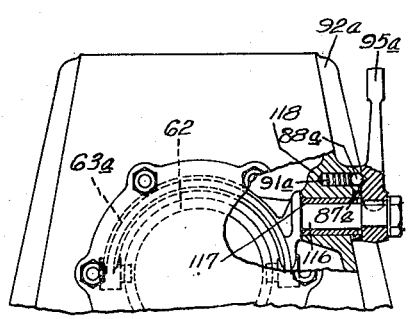
INVENTOR
L. Ray Buckendale
BY Strauch & Hoffman
ATTORNEYS

Patented Dec. 19, 1939

2,183,667

UNITED STATES PATENT OFFICE

2,183,667

DUAL RATIO DRIVE AXLE

Lawrence Ray Buckendale, Detroit, Mich., assignor to The Timken-Detroit Axle Company, Detroit, Mich., a corporation of Ohio Application May 28, 1936, Serial No. 82,357

9 Claims. (Cl. 74—327)

This invention relates to vehicle drive axles of the type embodying built-in change-speed mechanism. More particularly, this invention is concerned with improvements in double reduction drive axles of the type embodying readily and remotely controllable change-speed mechanism between the first set of reduction gearing and the differential mechanism of the axle.

The primary objects of the present invention are to provide improved change speed mechanism and control devices therefor in a dual ratio double reduction axle, to provide improved double reduction axle features of construction and to provide improved double reduction axles especially suitable for incorporation of the change speed mechanism.

The major object of the present invention is to devise a simplified dual ratio double reduction axle permitting the parts to be readily assembled and dismantled, and affording great facilitation of inspection and lubrication.

Another highly important object of the present invention is to provide a change-speed mechanism that can be easily and compactly incorporated in a drive axle, and that is as strong as any of the other parts in the power transmission chain. More specifically, it is an object to arrange a change-speed mechanism on the cross shaft of a double reduction axle, with the positive clutching device of the change-speed mechanism disposed adjacent to locus of maximum shaft deflection and designed to reenforce the shaft against such deflection.

Another major object of this invention resides in the provision of a change-speed assembly embodying a positive clutch that is shiftable to all positions easily and without shock or damage to the parts. More specifically, it is an object to provide a positive clutch comprising an annular slidable member having clutch teeth, and two aligned parts to be intercoupled having clutch teeth, with a full number of teeth on one of the three members, half of the full number of teeth on another of the members and a set of staggered or foreshortened teeth on the third member.

It is a further object of the present invention to provide new and improved shifting mechanism for the control of a slidable member in a change-speed mechanism. In this connection further objects are to provide the shifting mechanism with a snap action and to mount the shifting mechanism as a unit assembly in a removable part of the transmission casing.

It is also an object of this invention to provide an improved gear mounting and, especially, improved means for mounting a bevel gear on a cross-shaft which carries additional members, some of which are at times freely rotatable relative to the cross shaft.

It is another important object to devise a cross-shaft sub-assembly that is readily insertible into position as a unit and that may be readily adjusted thereafter with respect to the primary driving element.

A further object is to provide an improved pinion shaft, bearing and cage assembly that may be mounted in position as a unit and accurately adjusted with respect to the bevel gear of the cross-shaft.

Another important object of the present invention resides in the provision of an improved differential carrier for use in association with dual ring gears of a dual ratio drive axle.

Additional objects are to devise novel useful lubrication features for a dual ratio double reduction axle, and to incorporate in such axle, on certain parts of the change-speed mechanism, plain but effective bearing and tooth contact surfaces.

A still further object is to provide a novel helical gearing arrangement in a dual ratio double reduction axle such that thrusts resulting from reaction forces are effectively balanced and directed in suitably chosen predetermined directions with respect to the supporting members, bearings and the clutching device.

The foregoing and further objects of the invention will clearly appear from a study of the following description when taken in conjunction with the accompanying drawings and the appended claims.

In the drawings:

Figure 1a is a sectional view of a portion of Figure 1 taken on the line 1a—1a.

Figure 3 is a fragmentary side elevational view as seen when looking upon the plane of the line 3—3 of Figure 1 in the direction of the arrows, and illustrates a part of the change-speed device and its control mechanism.

Figure 4 is a fragmentary view, in partial section, as seen when looking upon the plane of line 4—4 in the direction of the arrows, in Figure 3.

Figure 5 is a top plan view of the change-speed control mechanism and its carrying plate, as seen when looking upon the plane of line 5—5 in the direction of the arrows, in Figure 3.

Figure 6 is a view similar to Figure 5 showing a slightly modified form of control mechanism.

Figure 7 is a quarter sectional view showing the profiles of the clutch teeth of one of the spur gears of the double reduction and change speed mechanism, and is representative of the profiles of the clutch teeth on the other spur gear of said mechanism.

Figure 8 is a side view of the slidable collar of the change speed mechanism.

Figure 9 is a sectional view of a modified form of clutch collar.

Figure 10 is a fragmentary view similar to Figure 4 showing another modified shift control mechanism. In this figure the manually operable external lever and its latch are shown about 90° out of true position in order to bring them into view in the illustration.

Figure 2:
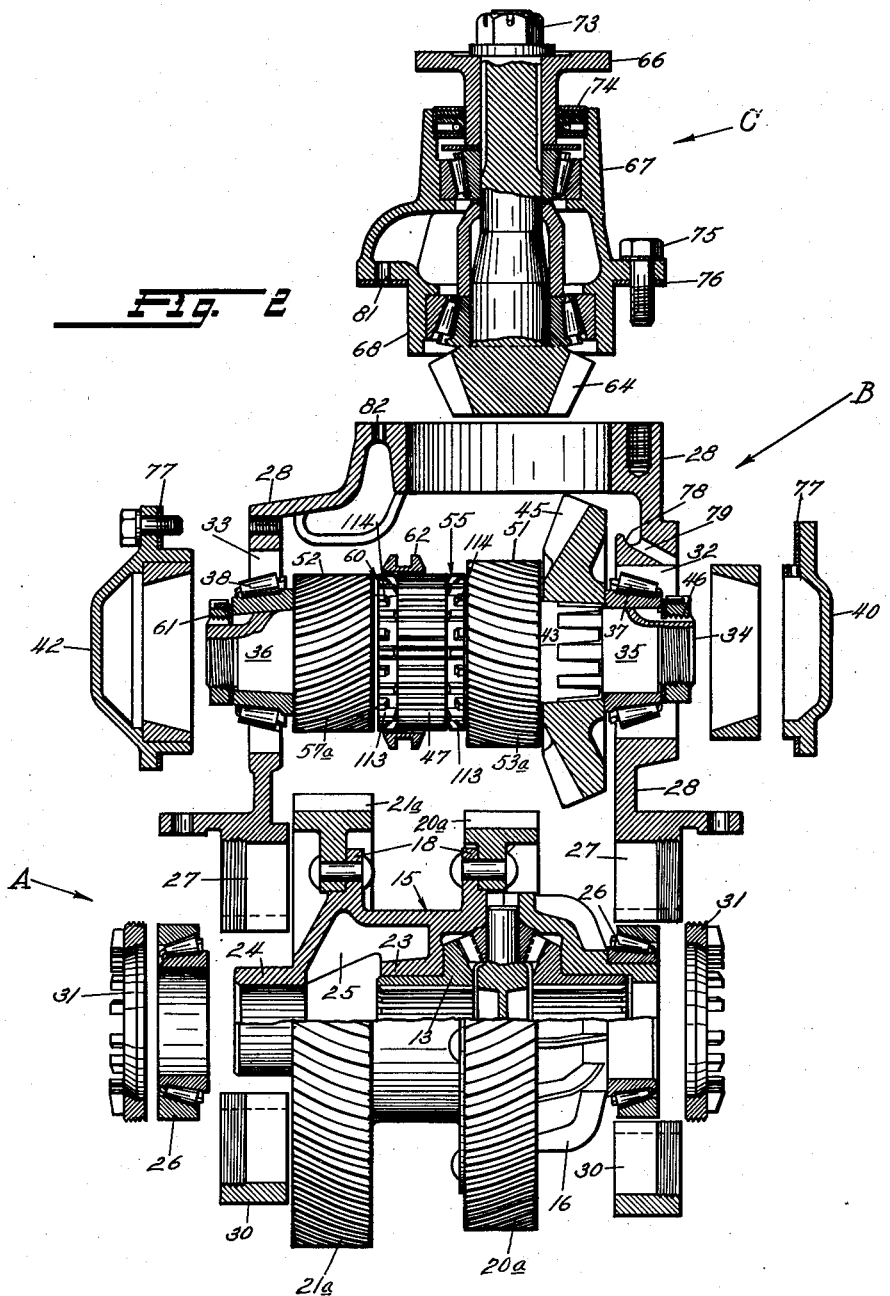
Figure 2 is a similar view with certain of the parts omitted and with the major unit sub-assemblies or sub-combinations arranged to illustrate the convenience with which the units are brought into assembled relation. The spur teeth of Figure 1 are modified.

With continued reference to the drawings wherein like numerals are employed to designate like parts, and with particular reference first to Figure 2, the apparatus of this invention, designed to be placed between a propeller shaft and the usual axle shafts of a drive axle housing, comprises three major sub-assembly or sub-combination units A, B and C. The unit A is a differential and dual ring gear assembly; the unit B constitutes a cross-shaft and change-speed mechanism assembly; and the unit C is a primary shaft, cage and bearing assembly. The three units will be described in detail as combined.

Figure 1:
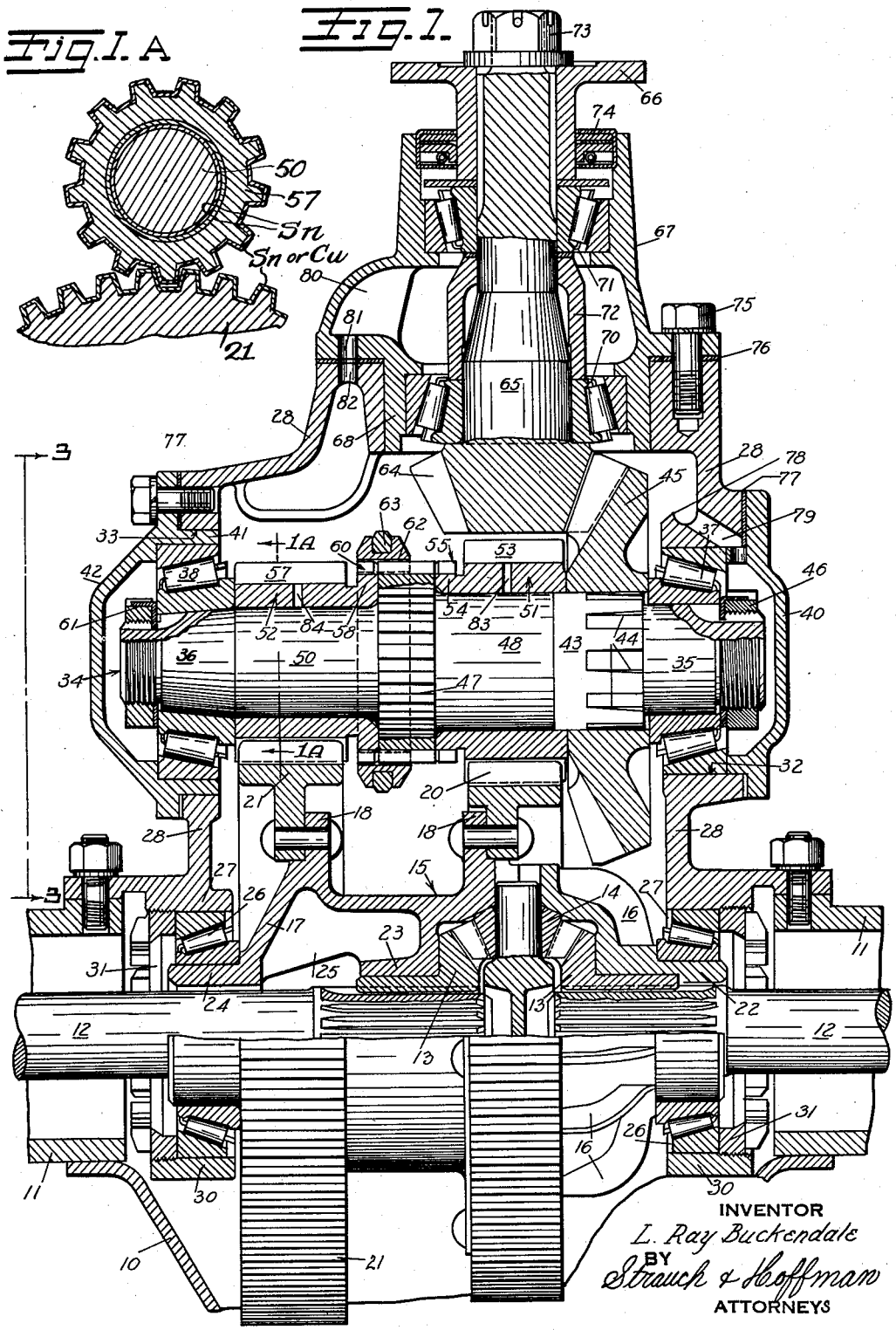
Figure 1 is a longitudinal section taken on a horizontal plane passing through the shaft axes of the drive, reduction and change-speed mechanism of one embodiment of the present invention.

With reference now to Figure 1, the numeral 10 indicates a differential housing bowl member which cooperates with a pair of axle shaft sleeves 11 to form what is commonly referred to as a drive axle housing. A pair of axle shafts 12 project into the bowl of this structure through the sleeve 11 and at their inner ends are in splined connection with side gears 13 of the differential mechanism which also includes pinion 14, this differential mechanism being contained within a specially shaped and constructed casing indicated generally at 15.

The right hand or removable side of the differential casing is secured to the left-hand side by bolts, not shown, and has a plurality of external ribs 16 for purposes of strength and heat dissipation and also, as will be hereinafter pointed out, for assisting in the lubrication of other parts of the axle structure. The other or left hand side of the differential casing includes a lateral extension terminating in an inclined or frustro-conical wall 17 which has on its outer periphery a flanged shoulder formation 18. A like flanged shouldered formation is formed on the casing directly opposite the differential mechanism, and to these formations 18, by rivets or suitable equivalents, are secured a pair of ring gears 20 and 21 having spur teeth on their peripheries. These teeth are shown in Figure 1 as straight spur type, and in Figure 2 as twisted spur or helical teeth, which are preferred for reasons set forth later.

The right hand end of the differential casing has a sleeve-like portion 22 within which one of the differential side gears is journalled, and a similar sleeve formation 23 provides a bearing for the other side gear. Spaced to the left of the sleeve 23 is a third sleeve-like formation 24, and a plurality of radially arranged strengthening webs 25 that interconnect the sleeves 23 and 24. The sleeves 22 and 24 are supported in roller bearing assemblies 26 which fit within a pair of bores 27. These bores 27 are formed in part by yoke-shaped portions or extensions of the casing section 28 of the sub-assembly B, and by complemental substantially semi-cylindrical members 30 that are secured to said yokes. A pair of externally threaded nuts 31 are screwed into the outer ends of the bores 27 into adjustable contact with the outer races of the bearing assemblies 26.

It will be noted that the differential mechanism and ring gear carrier in casing 15 is compact and of very rigid construction, particularly through provision of the flange 17 and the webs 25 and through the location of the shouldered flanges 18 with respect to those portions of the carrier which afford the greatest resistance to radial load. In particular it should be noted that the ring gear 21 is relatively close to the left-hand supporting bearing 26 so that most of the radial thrust from the ring gear 21 during operation is transmitted directly to said bearing assembly.

Substantially all of the parts above described constitute the sub-assembly unit A. The sub-assembly unit B includes the casing section 28 just mentioned, constructed and associated with other parts as follows. At one side the casing 28 has a bore 32 and at its other side it has a slightly larger bore 33. These bores are aligned and in parallelism with the axis of rotation of the parts previously described, a cross-shaft, indicated generally by the numeral 34, is arranged with its ends 35 and 36 within the bores 32 and 33, and concentrically thereof. The end 35 is so maintained by a bearing assembly 37, and the end 36 by a bearing assembly 38. The bearing 37 fits directly within the bore 32 and is held therein by an axially adjustable closure cap 40. The bearing assembly 38 fits within a cup portion 41 of an axially adjustable closure cap 42. The cup portion 41 snugly fits within the bore 33.

Adjacent its end 35 the cross-shaft 34 is provided with a tapered portion 43 carrying a series of splines 44 that taper gradually outwardly toward the end of the portion 43. A bevel gear 45, having a bore complemental to the elements 43 and 44 of the cross-shaft, is snugly fitted thereon, being pressed axially to a rigid working position by a lock nut assembly 46 engaging the bearing assembly 37 which in turn engages one side of the bevel gear.

Intermediate its ends the cross-shaft 34 is provided with an integral, enlarged, clutch tooth formation 47. Between this formation 47 and the tapered portion 43 the cross-shaft has a cylindrical surface 48, and on the other side of the formation 47 there is a cylindrical surface 50. These cylindrical surfaces 48 and 50 serve as bearing and supporting surfaces for a pair of small spur gears 51 and 52 respectively.

In Figure 1 the gear 51 has straight spur teeth 53 constantly in mesh with complemental teeth on the ring gear 20; and of course in Figure 2 the teeth are of the twisted spur or helical type, as at 53a. Gear 51 also has a radial extension 54 that contacts one side of the clutch formation 47 and that has a peripheral clutch tooth ring designated generally by the numeral 55. The teeth of this clutch ring are of special formation and will be described in detail later, but here it may be stated that they are equal in number to the clutch teeth 47 and disposed at a like distance from the axis of the countershaft.

As will more clearly appear later the spur gear 51 must at times be freely rotatable with respect to its bearing surface 48 on the countershaft, and accordingly, to preclude any possibility of the bevel gear 45 being urged tightly against the spur gear 51, the tapered splines 44 must be accurately located on the cross-shaft and properly interfitted with the complemental internal tapered splines of the bevel gear.

The other gear, 52, which is of a different diameter than the gear 51 for the purpose of obtaining a different reduction during operation of the axle, has upon its periphery either straight spur teeth 57 (Figure 1), or twisted spur or helical teeth 57a (Figure 2), which are constantly in mesh with the ring gear 21. This spur gear 52 has an axial extension 58 in contact with the left hand side of the enlarged clutch ring 47 and provided with a ring of teeth indicated generally at 60. The teeth of this ring 60 are arranged and constructed exactly like those of ring 55, as will be explained later. A locknut assembly 61 engages the inner race of bearing assembly 38 and presses the latter toward the spur gear 52, and since the shaft portion 36 is tapered the proper running clearance is established at the side of the gear 52 without jamming the latter against relative rotation with respect to the shaft portion 50.

A clutch collar 62 constantly rides upon the clutch ring formation 47 in non-rotatable relation with respect thereto and is axially slidable to interlock the formation 47 with either the ring of clutch teeth 55 or the ring of clutch teeth 60, all of which will be explained in detail later. Collar 62 receives a fork 63 forming part of an actuating or control mechanism yet to be described.

The third major sub-assembly unit C comprises a bevel pinion 64 in mesh with the bevel gear 45 and integrally formed on the inner end of a shaft 65 which at its outer end is in splined connection with a member 66 designed to be coupled with a propeller shaft or other suitable source of power. The pinion shaft 65 is mounted in a casing section 67 which at its inner end has a sleeve or cup formation 68 piloted in the end of the casing section 28. The mounting means comprises a pair of spaced roller bearing assemblies 70 and 71 separated by a spacer 72. The pinion shaft is axially fixed with respect to casing section 67 by nut 73 which engages the coupling member 66, the latter in turn cooperating with the bearing races, the spacer 72 and proper internal formations on the casing section 67, to positively locate the shaft. A seal assembly 74 closes the outer end of casing section 67.

The pinion 64 is accurately adjusted with respect to the bevel gear 45 through adjustment of the entire casing section 67 by means of shims 76 cooperating with cap screws 75. In addition to this axial adjustment of the pinion there is a lateral adjustment brought about by axially adjusting the countershaft assembly through the use of shims 77 at one or both ends of the latter between the casing section 28 and the closure caps 40 and 42.

Lubrication of all parts of the apparatus is accomplished effectively and automatically from the quantity of lubricant that partially fills the housing structure. Lubricant is thrown by the fins 16 on the differential casing onto the bevel gear 45. The latter deposits lubricant in a lip formation 78 on the casing section 28 from whence it goes through a passageway 79 to the outer end of the bearing assembly 37, which takes the major driving thrust of the bevel pinion on the bevel gear. Adequate lubrication of bearing 71 is assured by reason of a lateral pocket 80 in casing 67, this pocket means communicating with the casing section 28 by way of aligned passageways 81 and 82. The small spur gears, 51 and 52, have radial passages 83 and 84 extending between the surface of the pinion shaft and the roots of the spur teeth 53 and 57. In operation the rotation of the parts and intermeshing of the gears causes a pumping action forcing lubricant through these passages to assure adequate lubrication of the shaft surface portions 48 and 50, and of the lateral areas of contact of the parts 45, 47, 51 and 52.

In addition, the shaft surfaces 48 and 50 are coated or plated with tin to a thickness of about three or four-thousandths of an inch and then polished. The spur gears 51 and 52 within which the tinned portions of the cross-shaft are journalled likewise may be tinned both internally and externally. The ring gears 20 and 21 preferably are copper coated and the copper coating on the teeth of these ring gears coacts with the tinned coating on the spur gear teeth of members 51 and 52 to cause the pairs of gears to wear in evenly and smoothly during initial operation of the device. If desired, the teeth of the spur gears 51 and 52 may be coated with copper for coaction with the copper plate on ring gears 20 and 21 in accordance with the teachings of the application of M. B. Morgan, Serial No. 24,141, filed May 29, 1935, now United States Patent No. 2,075,995 issued April 6, 1937. Copper is used where feasible because it is cheaper than tin, although tin might be used on all the gears with equally good results. Tin is suggested for the spur gears 51 and 52 because both the teeth and the internal bores may be coated in one operation. This construction also eliminates the need for the well known bronze bushings common in the art and as a consequence produces a saving in manufacture and a strengthening of the gears due to the fact that the bores thereof need not be as large. In Figure 1a the aforementioned plated surfaces are shown, on a greatly exaggerated scale, in connection with gears 52 and 21 and the shaft portion 50, it being understood that the plated surfaces on gears 51 and 20 and shaft portion 50 are similar thereto.

With particular reference for the moment to Figure 2, in assembling the parts, the cross shaft unit as shown is brought into the illustrated position by inserting its small end through the large open end of the casing section 28 and hence laterally through the bore 33, after which the larger end carrying the bevel gear 45 is swung into the casing section and moved laterally into concentricity with bore 32. Thereafter the outer race of the bearing assembly 37 is fitted into bore 32 and the closure cap 40 is applied. Then the closure cap 42, containing the outer race of the bearing assembly 38, is placed in position. The proper number of shims are placed under the caps before the latter are locked in position. This completes the formation of the sub-assembly unit B. As is obvious, the unit C can now be readily attached to the small end of the casing section 28 with the bevel pinion in mesh with the bevel gear 45. Then the unit A, disposed as shown, is assembled with respect to the yoke members 27 of the casing 28 by placing the bearing assembly 26 around the ends of the differential casing 15, shoving the casing forwardly, securing the semi-cylindrical members 30 to the yoke members 27 and then screwing the nuts 31 into position.

The complete apparatus, assembled as above described, may now be converted into a drive axle by adding the sleeves 11 and bowl 10 and inserting the axle shafts 12 through the sleeves to bring their splined ends into the side gears of the differential unit.

The actuating or control mechanism for the clutch collar 62 is illustrated in Figures 3, 4 and 5. It comprises the fork 63, previously mentioned, having a cylindrical boss or sleeve 69 which is secured to an axially shiftable rod 85 by set screw 86. At one of its ends the rod 85 has a pair of detents or notches 87 for latching cooperation with a ball 88 that is pressed toward the rod by a plunger 90 against which reacts a coil spring 91. All of this mechanism is carried by a plate 92 which is secured over an opening in the casing section 28 by cap screws or any other suitable means. The plate has internally projecting integral sleeves 93 which are aligned to form the guideway for the axially slidable rod 85.

Shifting of the rod 85 is accomplished as follows. A pin 94 is journalled in the cover plate 92. One end of this pin projects externally of the plate and a manually operable arm 95 is secured thereto to oscillate the pin. The other end of the pin extends inwardly of the cover plate and has secured thereto an arm 96 provided with a yoke portion 97 which straddles a second pin 98, the latter being formed integral with or rigidly secured to the boss 69 of the collar actuating fork 63. Therefore, upon oscillation of the arm 95 the pin 98 will be urged in one direction or the other to cause reciprocation of the rod 85.

The free end of arm 95 carries a pin 100 to which is secured one end of a tension spring 101, the opposite end of the latter being hooked to a stationary bolt 102 that is securely fastened to cover plate 92. The spring arrangement is such that after the arm 95 has been manually operated through a small angle from one of the yieldingly latched positions of the control rod 85, a dead center position is reached, and after passing its dead center position the tension spring operates with a snap action effect to quickly urge the control rod to its other yieldingly latched position. This snap action occurs in both directions of oscillation of the arm 95 (the second position being illustrated in broken lines in Figure 5) and the boss 69 is not carried beyond either of the yieldingly latched rod positions because it is prevented from doing so by spacing the rod guiding sleeves 93 so that they also serve as stops.

Remote control for manual operation of the arm 95 is afforded by an elongated rod 103 (Figure 3) connected to the arm 95 by the pin 100 and extending away from the axle toward the driver's seat.

The entire control mechanism, it will be observed, is carried by the cover plate 92 for detachment and assembly as a unit therewith, it being only necessary when making the assembly to slide the fork 63 into the groove of collar 62 before fastening the cover plate to the casing section 28.

In Figure 6 there is illustrated a slightly modified form of control mechanism, wherein all of the parts are located internally and connected to a cable or wire for remote external operation. In this form there is a slightly altered casing section 28a carrying a stationary pin 94a which corresponds to the pivotal mounting 94 in the form previously described. The arms 95 and 96 of the first form are replaced by a bell crank 104 which is pivotally mounted on the pin 94a and has a pair of arms 95a and 96a. The arm 96a carries the yoke 97 for actuation of the pin 98 and the arm 95a is adapted for manual operation as follows.

The casing section 28a has a slotted sleeve formation 105 with which cooperates a bolt and nut assembly 106 for mounting and securely holding the end bushing 107 of a flexible cable structure which comprises an outer surrounding wire 108, a sheath 109 and a cable or wire 110. The cable 110 projects freely into the casing and has a terminal eye 111 connected to the arm 95a by means of a pin 112. In response to reciprocation of the cable 110 the bell crank 104 is oscillated about its pivotal axis to cause the rod 85 to shift to one or the other of its yieldingly latched positions.

A further modified and more simplified form of control mechanism is shown in Figure 10. In this embodiment a fork 63a is provided which is mounted, not for reciprocation but for oscillation with an integral shaft extension 116. The extension 116 passes directly through a cover plate 92a and is rotatably supported therein by a bearing sleeve 117, carried by an annular boss 118 formed on the cover plate. Boss 118 has a recess therein designed to receive a spring 91a which presses a ball 88a outwardly into any one of several detents 87a that are provided in an enlarged surface portion of an arm 95a that is keyed to and locked upon the shaft extension 116, as shown.

Manual operation of arm 95a, through rod 103 in the manner previously described, causes rotation of the shaft 116, and thus fork 63 is actuated to slide collar 62 for selective engagement with the gears 51 and 52.

In the modified forms just described, as in the first form, a snap action spring may be provided if desired. It is desirable to use the snap action type of mechanism in any case, but it is especially desirable to associate it properly with the illustrated novel type of positive clutch, as will be apparent from the following detailed description of the particular preferred tooth forms utilized on the elements of the positive clutch mechanism.

With reference to Figure 2 and to the detailed views 7 and 8, it will be observed that special tooth forms and arrangements are provided for the positive clutch device. As shown in Figures 2 and 7, the ring 55 of clutch teeth on the lateral extension of the gear 51 consists of a total number of teeth that is equal to the total number of teeth on the shaft formation. However, this ring 55 consists of alternated full width teeth 113 and foreshortened or backset teeth 114. There is an equal number of each, and the short teeth are backset in a direction away from the clutch formation 47. All of the teeth are of involute form, as are those also of the formation 47, and their ends which face the clutch collar are chamfered at 115, as shown.

In like manner the ring 60 of teeth on the lateral extension of the gear 52 comprises alternated teeth 113 and 114, chamfered as at 115.

The clutch collar 62, on the other hand, preferably has a series of internal teeth 116 which are of full width and which are exactly complemental to the teeth of the shaft formation 47, except for chamfering at their ends corresponding to the chamfer 115 on the teeth 113 and 114. However, there are only half as many teeth on the collar as are present on the shaft formation 47 or on each of the rings 55 and 60, every other tooth in the collar being eliminated.

With the parts of a positive clutch thus constructed, the collar may be shifted axially into coupling engagement with one spur gear or the other easily and without shock. During initial engagement the relatively widely separated teeth 116 of the collar and the relatively widely separated teeth 113 of the adjacent spur gear can be readily brought into overlapped relationship without binding and without resistance, and thereafter it is a simple matter to slide the collar farther until its teeth 116 are sandwiched between the long and short teeth 113 and 114 respectively of the particular clutch member. During these initial and final movements the chamfering on the teeth facilitates an easy and quiet interlock.

The snap action mechanism is preferably so arranged that during the above described initial movement of the collar 62 the tension spring 101 reaches and just passes dead center position. Then the spring acts to complete the movement by shifting the collar teeth quickly into position between the teeth 113 and 114 of the gear clutch element. The initial shifting movement is thus manually performed and the second or final movement is automatically performed. This is desirable, not only because it is automatic but also because the automatic operation is performed under a light substantially constant pressure without tendency to force or jam the clutch elements into complete engagement.

While it is preferable to provide the extensions of gears 51 and 52 with the foreshortened or backset teeth 114 and collar 62 with half as many teeth as on shaft 47, it is to be understood that the clutch collar may be provided with an equal or full number of teeth. In the event this is done the teeth of collar 62 will be staggered or alternately foreshortened, as shown in Figure 9 where clutch collar 62a is provided with foreshortened or backset teeth 114a in addition to its full width teeth 113a. The operation of the device modified in this manner is the same as that previously described, regardless of whether or not the foreshortened teeth 114 of the gears are eliminated. If these teeth 114 are permitted to remain they cooperate to provide a connection that is stronger against shearing stresses.

When the parts of the complete device are assembled and operated as above described, it will be readily understood that the pinion and bevel gear are in constant mesh; that the ring gear 20 is constantly in mesh with the gear 51, and that the ring gear 21 is in constant mesh with gear 52; and that two selective speeds are permitted by coupling the clutch collar 62 with either the clutch tooth ring 55 or the clutch tooth ring 60, at which time the coupled small spur gear will be positively driven and the other or uncoupled spur gear will have relative rotation with respect to the cross-shaft.

As previously mentioned, the gears 20, 21, 51 and 52 may be provided with twisted spur or helical teeth, as shown in Figure 2. Preferably, at least, the mated "low" gears 21 and 52 have helical teeth 21a and 57a with their angles of inclination such, as shown, that when power flows through them the differential unit thrust will be taken by the right hand carrier bearing 26 while the major part of the radial load will be taken by the left hand bearing 26. This affords a good balance of forces, and permits both bearings 26 to be of relatively light and inexpensive design. During such operation in "low", the thrust in the cross shaft unit is, of course, in the opposite direction, with the result that it substantially neutralizes the opposed thrust set up by the bevel gearing, thus permitting the bearings 37 and 38 to take approximately equalized radial loads and to be of inexpensive sizes. Further advantages of this tooth inclination are that the left-hand thrust of gear 52 prevents any tendency for the clutch collar to become uncoupled, and that the right hand thrust of gear 21 seats said gear firmly against the lateral face of its supporting flange 18.

The "high" gears 20 and 51 of the speed change unit may be likewise designed but, due to the lesser reduction of this train and the fact that the radial forces in it are more centrally located on both the differential and the cross-shaft bearings, the tooth inclination here is not so important. Accordingly, where permissible, and as illustrated in Figure 2, the gears 20 and 51 have their teeth 20a and 53a oppositely inclined relative to those of the other gear train because the advantages of the opposite inclination outweigh any disadvantages. The advantages here referred to are the prevention of any tendency of gear 51 to exert a thrust urging the clutch collar 62 out of coupling engagement, and the production of a left hand thrust in gear 20 to seat said gear against its lateral supporting flange 18.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a dual ratio axle, a differential unit comprising an outer wall and three axially spaced sleeves rigidly joined together by said outer wall, the middle sleeve and one of the end sleeves cooperating to form a chamber, a differential mechanism mounted in said chamber and having side gears journalled in the middle sleeve and said one end sleeve, a pair of ring gears secured to said outer wall, one of said ring gears being adjacent the other of said end sleeves and the other of said ring gears being substantially centered with respect to said differential mechanism, and means for mounting said casing comprising a pair of bearing members surrounding the end sleeves.

2. In the combination defined in claim 1, said outer wall being split on a plane approximately midway between said side gears, said one end sleeve being removable with one section of the split wall, one of said last named ring gear being secured to the other section of the split wall in proximity to said plane, and a plurality of ribs integral with and disposed between the middle sleeve and said other end sleeve.

3. A multispeed double reduction axle construction consisting of a plurality of preassembled units that can be readily joined in accurately adjusted relationship, said units comprising a middle unit and two end units; the middle unit comprising a casing section open at its ends and having aligned apertures in its sides, a cross shaft mounted in said apertures and carrying a bevel gear and further gearing including change speed mechanism, and means for axially adjusting the cross shaft and its gearing as a body; one end unit comprising a cage complemental to one of the openings of the casing section of the middle unit and carrying a pinion shaft and bearings therefor in fixed adjusted position, and means for adjusting said cage axially with respect to said casing section; and the other end unit comprising a differential casing carrying an internal mechanism and external ring gears, and means for adjustably securing said differential casing to the other open end of the casing section of the middle unit.

4. A preassembled sub-combination for use in a multispeed drive axle, said sub-combination comprising a casing section having a small opening at one end and a large opening at the other, said section being further provided with a pair of aligned cylindrical apertures of different sizes in its sides, a cross shaft disposed with its ends within said apertures and carrying a large bevel gear adjacent the smaller aperture, a bearing assembly fitted directly within said smaller aperture, further gearing including a gear adjacent the larger aperture and of such diameter as to permit its passage axially thru the latter, a cup fitted within said larger aperture, a bearing assembly mounted within said cup, and said large opening being of such size and shape as to permit said bevel gear to pass therethrough when mounted on the cross shaft.

5. A preassembled unit for use in a multispeed drive axle between a primary input shaft and the axle differential, said unit comprising a short shaft having an integral enlarged clutch formation intermediate its ends, a bearing surface on the shaft at each side of said enlargement and a tapered surface adjacent each bearing surface, a pair of externally toothed members each having a bore complemental to one of the said bearing surfaces, an anti-friction bearing assembly fitted to one of said tapered surfaces, a shaft driving gear secured on the other tapered surface, and a second anti-friction bearing assembly fitted to said shaft adjacent said gear.

6. In a dual ratio axle, a differential unit carrying dual ring gears, a cross shaft having a pair of gears journalled thereon constantly meshing with said ring gears and spaced apart axially of said shaft, a shiftable clutch member mounted between said last named gears and adapted to selectively couple either of said gears to said shaft, said gears being provided with twisted spur or helical teeth, the inclination to the teeth on said gears being such that the axial thrust component on said journalled gears is directed away from said clutch member.

7. In a dual ratio axle, the combination set forth in claim 6 wherein said ring gears are carried by radial flanges on said unit arranged so that said axial component forces said ring gears firmly against said flanges.

8. In a dual ratio axle, a differential unit comprising a casing, having a portion adapted to receive a differential mechanism and an extension projecting axially away from said portion, a differential mechanism in said portion, and a pair of ring gears, one secured to said portion in surrounding relation to and substantially centered with respect to said mechanism and the other secured to said extension, means providing a pair of bearings for carrying said casing, one of said bearings received by said portion in close proximity to the differential mechanism and the other received by said extension in close proximity to the ring gear mounted on the latter, there being an approximately radially arranged flange constituting that part of the extension which is disposed between the last mentioned ring gear and the last mentioned bearing.

9. In a double multi-speed axle, a housing, a cross shaft journalled in said housing, spaced pinion gears journalled on said cross shaft, spaced aligned bearings in said housing, a differential carrier journalled at its opposite ends in said bearings, spaced ring gears secured to said carrier adjacent each end thereof, said ring gears meshing with said pinions, said ring gears and pinions being provided with twisted spur or helical teeth, means for driving said cross shaft, means for selectively coupling said pinion gears to said cross shaft to drive said carrier through one or the other of said ring gears, said teeth on said ring gears being inclined so as to produce an axial thrust towards the bearing remote from the ring gear being driven.

L. RAY BUCKENDALE.